United States Patent [19]

Dohnalik

[11] 4,163,651

[45] Aug. 7, 1979

[54] PAPER CHIP COLLECTING AND COMPACTING APPARATUS

[75] Inventor: Joseph J. Dohnalik, Chicago, Ill.

[73] Assignee: Garden City Envelope Company, Chicago, Ill.

[21] Appl. No.: 754,108

[22] Filed: Dec. 27, 1976

[51] Int. Cl.² .......................................... B01D 45/00
[52] U.S. Cl. ...................................... 55/344; 55/418; 55/432; 55/515; 251/300
[58] Field of Search ............... 55/1, 97, 312, 314, 55/344, 350, 319, 385 R, 418, 430, 432, 433, 515; 98/115 R; 83/100, 911; 93/61 R, 36 A; 251/300; 220/345

[56] References Cited

U.S. PATENT DOCUMENTS

| | | | |
|---|---|---|---|
| 419,954 | 1/1890 | Hunter | 55/319 |
| 1,527,494 | 2/1925 | Sullivan | 55/432 |
| 1,867,080 | 7/1932 | Kraft | 220/345 |
| 2,021,853 | 11/1935 | Curley | 55/515 |
| 2,539,257 | 1/1951 | Limberg | 55/332 |
| 3,272,651 | 9/1966 | Quirk | 83/100 |
| 3,373,545 | 3/1968 | Christianson | 55/317 |
| 3,423,906 | 1/1969 | Fried | 55/432 |
| 3,424,501 | 1/1969 | Young | 55/350 |
| 3,546,852 | 12/1970 | Furstenberg et al. | 55/341 WT |
| 3,762,143 | 10/1973 | Stewart | 55/283 |

*Primary Examiner*—Bernard Nozick
*Attorney, Agent, or Firm*—Neuman, Williams, Anderson & Olson

[57] ABSTRACT

A bin for pneumatically collecting paper chips comprises a chamber for receiving a stream of air containing paper chips and for collecting the paper chips. The chamber has inlet and exit ports so positioned as to cause a downward current of air to thereby compact the paper chips collected therein and means in the interior of the chamber for separating substantially all of the paper chips from the air stream and for collecting the separated paper chips in a lower portion of the chamber. The bin may also include means for opening a portion of the chamber to allow the collected chips to be removed from the chamber.

8 Claims, 4 Drawing Figures

PAPER CHIP COLLECTING AND COMPACTING APPARATUS

This invention relates generally to a bin for pneumatically collecting paper chips and more particularly concerns a bin for pneumatically collecting and compacting paper chips therein.

Paper chips result from numerous manufacturing processes involving paper. One such process is the manufacture of paper envelopes. In such processes, disposal of such paper chips is a major problem. Typically, the paper chips are conducted pneumatically to a waste bin wherein the paper chips are collected and which contains a perforated receptacle. The perforations in the receptacle are small enough so that substantially all of the paper chips are trapped inside the receptacle while the air transport medium from which substantially all of the paper chips have been removed is allowed to vent from the waste bin. When the receptacle is full of paper chips, it must be replaced or emptied.

Conventionally, after separation from the paper chips, the air is vented from the waste bin at a point relatively high in the bin, which tends to cause the paper chips in the receptacle to be suspended by the swirling and upward-moving air current with the result that the chips settle lightly in the receptacle, such that relatively few paper chips are required to fill the volume of the receptacle. Thus, the receptacle must be emptied or replaced frequently.

Further, in the conventional waste bin, for example the waste bin distributed by the F. L. Smithe Machine Co. of Duncansville, Pa., the receptacle is replaced or emptied manually by laterally removing the receptacle from the waste bin. Manual removal of the receptacle from the waste bin can be a difficult and time-consuming task since substantial weights of paper chips can be collected in maufacturing processes involving paper. For example, paper chips weighing a ton or more can be collected from one high speed envelope-making machine in one work shift in a typical envelope manufacturing operation.

It is an object of this invention to provide an improved waste bin for pneumatically collecting paper chips. It is an additional object of this invention to provide such a bin in which the chips are compacted as they are collected. It is also an object of this invention to provide a means for easily and conveniently removing the chips collected in the bin. It is a further object of this invention to provide a means for allowing the chips collected therein to be unloaded by gravity from the bin. These and other objects will be apparent from the following description.

This invention is a waste bin for pneumatically collecting paper chips and comprises a chamber for receiving and collecting the paper chips, having an upper portion and a lower portion. An inlet port in the upper portion admits a stream of air containing the paper chips to be collected, and an outlet port in the lower portion permits withdrawal of a stream of air from which substantially all of the paper chips have been removed. Means is provided in the interior of the chamber for separating the paper chips from the stream of air and is so constructed and positioned within the chamber as to permit free passage into the chamber of the stream of air containing the paper chips, to separate substantially all of the paper chips from the stream of air, to permit the separated paper chips to be collected in the lower portion of the chamber, and to allow withdrawal from the lower portion of the chamber of a stream of air from which substantially all of the paper chips have been removed. The inlet and outlet ports in the chamber are so positioned as to cause a downward current of air so that the paper chips collected therein are compacted by the downward flow of air from the inlet to the outlet.

For a more complete understanding of this invention, reference should now be made to the embodiments illustrated in greater detail in the accompanying drawings and described below by way of examples of the invention. In the drawings.

Figure 1:
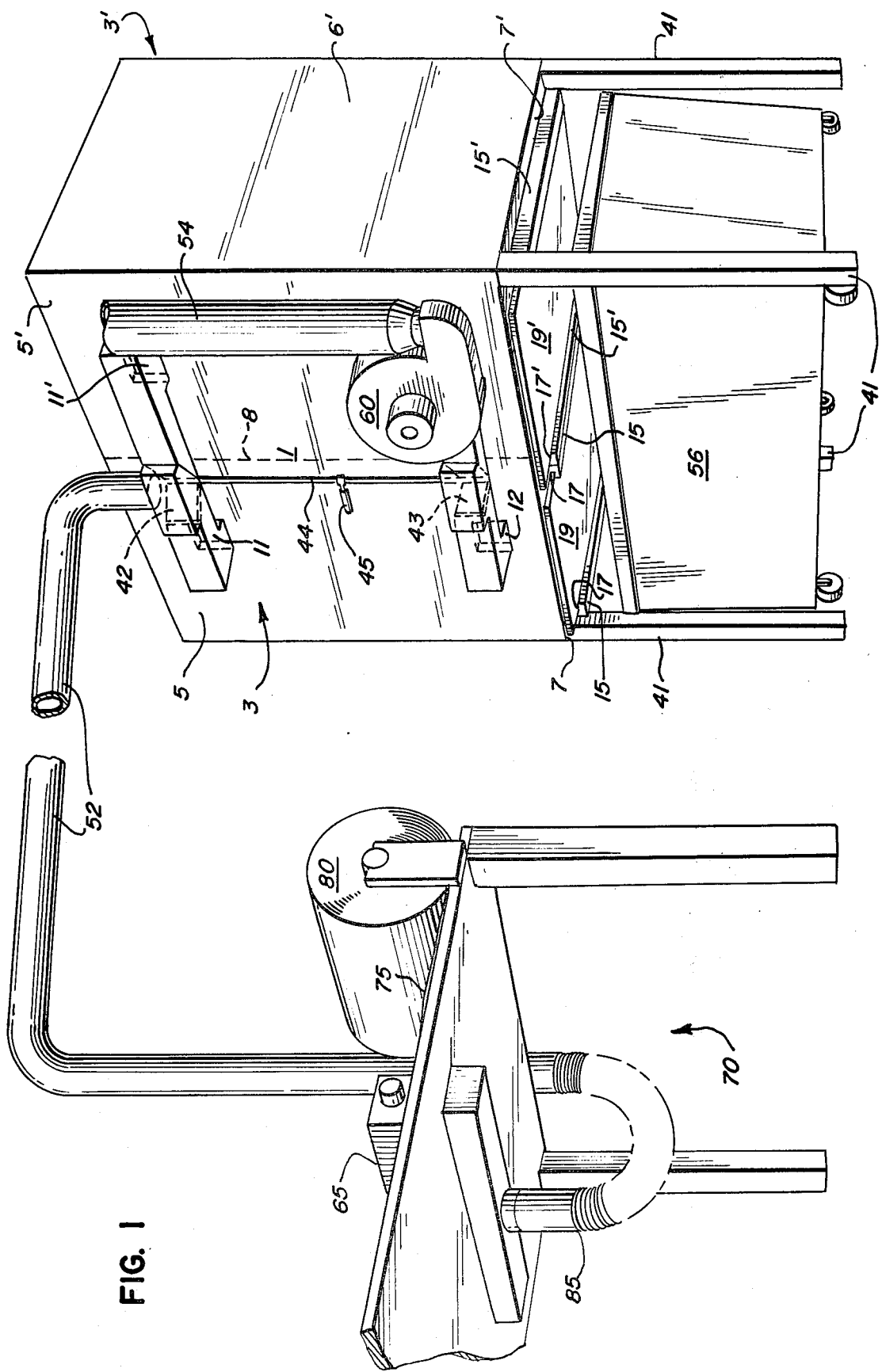
FIG. 1 is a perspective view of a preferred embodiment of this invention.

The waste bin of this invention comprises a chamber preferably elevated as on legs. Also, in this invention, as currently being used and as shown in FIG. 1, a dual-chamber waste bin 1 contains two such chambers, for example, chamber 3 and 3', which are described in detail hereinafter, and which are juxtaposed and supported on the legs 41. FIG. 1 is a view of the back side of such juxtaposed chambers 3 and 3'. Back walls 5 and 5' of chambers 3 and 3', respectively, are shown as well as side wall 6' which appears as the left side when chamber 3' is viewed from its front. The location of a common wall between chambers 3 and 3' is indicated by the dashed line 8. Elevation of the chambers on the legs 41 permits emptying of the compacted paper chips from the waste bin through openings, such as shown at 13 in FIG. 2, in the bottoms 7 and 7' of the chambers 3 and 3'. These bottom openings normally are closed by panels 19 and 19'. These panels fit engagingly into channels 17 and 17', respectively, formed in runners 15 and 15', and are slidably movable therein to open or close tightly the bottom openings. The chips thus may be emptied from the bin by gravity dumping directly into a portable container 56 positioned under the panels 19 and 19'.

Juxtapositioning of the chambers 3 and 3' permits the continuous collection of paper chips which are produced at a paper-employing machine, for example, an envelope-making machine, first in one chamber until such chamber is full and then in the adjacent chamber, without interruption. This is made possible by means of valves 42 and 43 for selecting between the chambers. Valves 42 and 43 are square sheet metal baffles which are supported on and can be pivoted on vertical rod 44 so as to close the inlet port 11 and outlet port 12 of chamber 3 to the stream of air and simultaneously open the inlet port 11' and outlet port (not shown) of the adjacent chamber 3' to such stream of air, and vice versa. Both valves can be opened and closed separately or together by any suitable means. In the embodiment of FIG. 1, the valves are manipulated together and by lever 45 which is attached to rod 44 and whose action is employed to move rod 44 and the valves 42 and 43. Use of this technique makes it unnecessary to duplicate the pneumatic tube 52 leading from the envelope-making machine to each of the juxtaposed chambers 3 and 3'. Similarly, pneumatic tube 54 vents the stream of air substantially free of paper chips from either chamber to the atmosphere. By using the above-described valves 42 and 43, the same pneumatic tubes 52 and 54 are used for both juxtaposed chamber 3 and 3'.

A blower 60 in pneumatic tube 54 is employed to create a partial vacuum in the chamber 3 or 3' then being used to collect paper chips and to withdraw a stream of air and paper chips from the cutting and work area (shown only generally at 65) of the envelope-making machine 70, where a paper sheet 75, after being drawn from a roll of paper represented schematically at 80, is cut and formed into an envelope. The air stream and paper chips are withdrawn through the pneumatic tube 85 which extends downwardly and then away from the work area 65. From there, the air stream and paper chips are conducted through pneumatic tube 52 to the chamber 3 or 3' then being used to collect paper chips.

Figure 2:
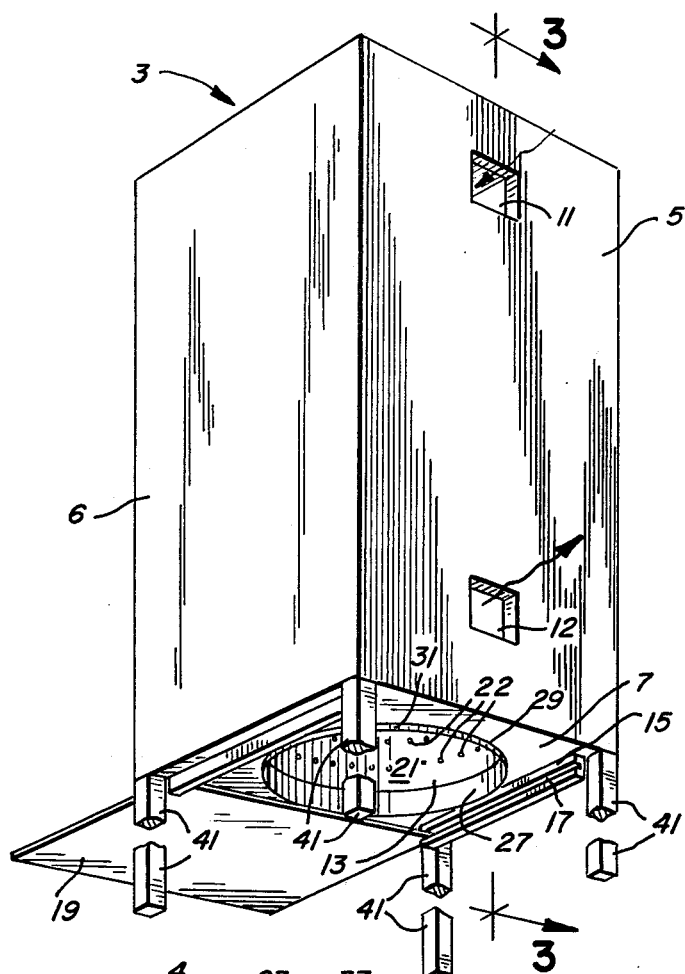
FIG. 2 is a perspective view of one embodiment of this invention.
Figure 3:
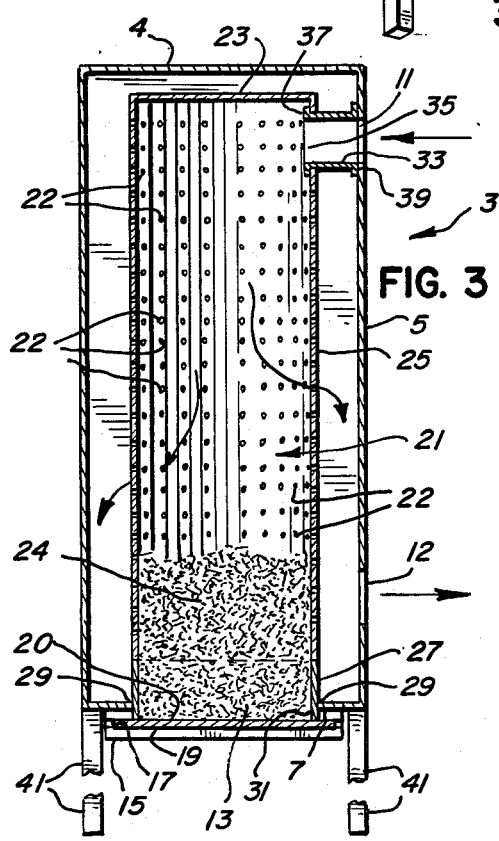
FIG. 3 is a vertical section view, taken along plane 3—3 of FIG. 2 with panel 19 in its closed position.

Referring collectively to FIG. 2 and 3, each chamber of the waste bin for collecting paper chips of the present invention comprises a top 4, left and right sides 6, front (not shown) and back sides 5, and a bottom 7. Back side 5 has an inlet port 11 for introduction of a stream of air carrying paper chips and an outlet port 12 for exhausting the air stream substantially free of papers chips. The bottom 7 has a circular opening 13 therein and support runners 15 containing channels 17. A panel 19 fits engagingly into channels 17 and is slidably movable therein to open or tightly close hole 13 and is shown in FIG. 2 in its pulled-out position with hole 13 open and in FIG. 3 in its pushed-in position with hole 13 closed. Airtight conduits (not shown) can be connected to the back side 5 at the ports 11 and 12 for transport of the stream of air containing paper chips to the chamber 3 and for withdrawal of a stream of air substantially free of paper chips from the chamber 3, respectively.

Each chamber 3 or 3' includes means for separating the paper chips from the incoming stream of air, comprising a perforated screen in the form of a substantially vertical cylindrical container 21 connected to an imperforate inlet tube 33. The container 21 has a top 23 and a side 25 and is open at its bottom. The lower portion 27 of side 25 is not perforated, and abuts the bottom 7 of chamber 1 at all points along the periphery 29 of the opening 13 so that a substantially airtight seal is formed between the lower portion 27 and the bottom 7. A lower end section 31 of portion 27 extends below the bottom 7 of the chamber 3 and abuts the top surface 20 of panel 19 in its closed position to form a substantially air tight fit so that, when panel 19 is in its closed position, air flowing through chamber 3 passes only into inlet port 11 and out of outlet port 12. The side 25 has an the inlet port 35. The ends 37 and 39 of the tube 33 are connected to inlet ports 35 and 11, respectively, to provide a closed conduit for passage of the paper chips into the chamber 3 and into the container 21. A single chamber 3 may be used alone as a waste bin, preferably being elevated as on legs 41. However, for continuous collection operations, two such chambers preferably are juxtaposed with one another as shown in FIG. 1.

In operation, the stream of air containing paper chips is fed to inlet port 11, through the tube 33 and into the container 21 in the chamber 3. Once this stream passes through the inlet port 35, the air is free to pass through the perforations 22 in the container 21 and finally through outlet port 12. Substantially all of the paper chips, being larger in dimension than the dimensions of the perforations 22 in the container 21, are confined within the container 21 and are thus separated from the air. The stream of air thus serves as a transport medium to convey the paper chips from a location or locations outside of the bin of this invention and into the bin in a conventional manner. However, since the inlet port 11 is positioned at a point in the upper portion of the chamber 3 while the outlet port 12 is disposed substantially below the inlet port 11 and at a point in the lower portion of the chamber 3, the air passing through the chamber 3 is forced to flow in a downward path, thereby propelling the paper chips 24 confined within the container 21 downward towards the bottom 7 so that the paper chips 24 are compacted by the downward movement of air through the chamber 3 as well as by the natural gravitational effect.

The compacted paper chips 24 are collected on the top surface 20 of the panel 19 in the region defined by the abutment of the lower end 31 of the container 21 and the top surface 20 of panel 19. When a sufficient volume of paper chips 24 is collected within the container 21, the stream of air to the inlet port 11 is stopped or diverted to another waste bin, preferably a juxtaposed chamber 3' as shown in FIG. 1. Then the panel 19 is slidably moved to the position shown in FIG. 2 to permit the paper chips 24 to fall by the force of gravity from the bin through opening 13 in the bottom 7 of chamber 1 and into a portable container (not shown).

In one specific version of the embodiment of FIGS. 2 and 3, the chamber 3 was steel, and each of the top 3 and the bottom 7 thereof measured 30 inches square while all of sides 5 and 6 were 60 inches long. Hole 13 in bottom 7 was circular and measured 24 inches in diameter. Panel 19 was a planar and rectangular piece of plastic and measured 32 inches long by 25 inches wide. Container 21 was cylindrical and measured 24 inches in diameter and 58 inches long and extended ¼ inch below bottom 7. Container 21 was metallic and contained perforations measuring 5/16 inch and accounting for about 47 percent of the surface area of the container 21. Inlet ports 11 and 35 were 7 inches square, and outlet port 12 was 6 inches square. Tube 33 was welded to chamber 3 and container 21 at its ends 39 and 37, respectively, while bottom portion 27 of container 21 was welded to the bottom 7 of the chamber 3 at the periphery 29 of opening 13. The chamber 3 was supported on legs 41 which were approximately 40 inches long, a sufficient length to permit a suitable portable container to be placed under panel 19. Chamber 3 was juxtaposed and shared a common wall with the chamber 3' which had identical components and dimensions as chamber 3, as shown in FIG. 1. The dual-chamber waste bin was used to collect paper chips produced in an envelope-making operation using a web-type envelope-cutting machine, in particular the CF-3 Model distributed by Smithe-Rema.

Figure 4:
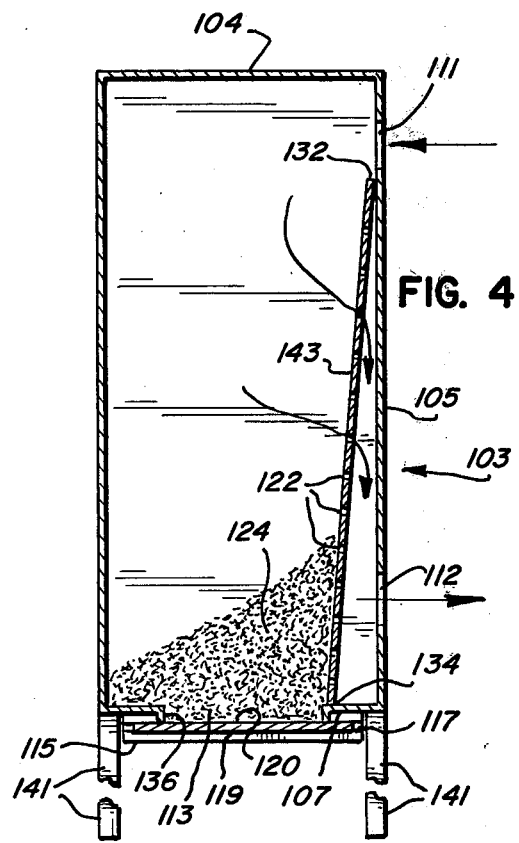
FIG. 4 is a vertical sectional view corresponding to FIG. 3 of a second embodiment of the present invention.

An alternate embodiment of the present invention is shown in FIG. 4 where the container 21 and tube 33 of the embodiment shown in FIG. 3 are replaced simply by the rectangular planar screen 143. The components of the embodiment of FIG. 4 which correspond to similar parts of the embodiment shown in FIG. 3 and decribed above, are identified by corresponding numerals in the 100 series and are not otherwise described further.

The top 132 and bottom 134 edges of planar screen 143 abut side 105 and bottom 107, respectively, of chamber 103, while the side edges (not shown) abut the left and right sides (not shown) of the chamber 103. As with the container 21 in the embodiment shown in FIG. 3, the screen 143 in FIG. 4 serves to separate the paper chips 124 from a stream of air containing paper chips which is introduced into the chamber 103 through the inlet port 111 in side 105 by permitting the air to pass through the perforations 122 in the screen 143 and then through the outlet port 112 but preventing the passage of the paper chips 124 through the perforations 122 in the screen 143, by virtue of the fact that the perforations 122 in the screen 143 are smaller in dimension than the dimensions of the paper chips 124. Due to the relative positions of the inlet port 111 and outlet port 112, the air passing through the chamber 103 is forced to flow in a downward path thereby propelling the paper chips 124 towards the top surface 120 of panel 119 where the paper chips 124 are collected and compacted by the downward movement of air through chamber 103. When a sufficient volume of paper chips 124 is collected in the chamber 103, the stream of air to the inlet port 111 is stopped or diverted to another waste bin, preferably a juxtaposed chamber as shown in FIG. 1. Then the panel 119 is slidably moved to permit the paper chips to fall by the force of gravity from the bin through hole 113 in the bottom 107 and into a portable container (not shown). The bottom 107 is equipped with a downwardly extending flange 136 around the periphery of the hole 113. This flange abuts the top surface 120 of panel 119 in its closed position to form a substantially airtight seal so that, when panel 119 is in its closed position, air flowing through chamber 103 passes only into inlet port 111 and out of outlet port 112.

Alternatively, other embodiments of the waste bin of this invention may be provided similar to that shown in FIGS. 2 and 3, and wherein container 21 is a removable receptacle closed at its bottom end. In such case, chamber 3 would be constructed so as to permit a front side 5 or left or right side 6 thereof to be opened and container 21 would then be so constructed as to be removable from chamber 3, so that, when a sufficient volume of paper chips 24 has been collected within the container 21, container 21 could be removed laterally from the waste bin and emptied manually. Also, in this case, it would not be necessary for the chamber 3 to be elevated as on the legs 41 or to have the hole 13 in its bottom 7. This alternate embodiment would still allow the paper chips to be compacted during collection, permitting the paper chips to be removed therefrom less often than with prior art devices.

While particular embodiments of the present invention are shown above and described, it will be understood, of course, that the invention is not to be limited thereto, since many modifications may be made. For example, the screens 21 and 143 can readily be replaced by any of a variety of devices for separating the paper chips from the stream of air and by other screens having any of a variety of configurations, and the ports 11, 12, 111 and 112 can be positioned in a wide variety of specific locations. Similarly, chambers 3 and 103 can be replaced by chambers having a variety of shapes. It is contemplated, therefore, by the appended claims, to cover any such modifications as fall within the true spirit and scope of this invention.

What is claimed is:

1. A waste bin for pneumatically collecting, storing and compacting paper chips comprising:
   a chamber for receiving, compacting and collecting said paper chips, said chamber being vertically elongated and having an upper portion and a lower portion in which said paper chips are stored and compacted, and having an inlet port in said upper portion for introducing into said upper portion of said chamber a stream of air containing said paper chips and an outlet port in said lower portion for withdrawing from said lower portion of said chamber a stream of air from which substantially all of said paper chips have been removed, said chamber also having a top member, a side member, a bottom and an outlet portion, said bottom including a panel closure slidably movable to open a portion of said bottom to allow collected and compacted paper chips to fall from said chamber by the force of gravity, and said outlet portion extending downward into abutting relation with said panel closure;
   perforated screen means in the interior of said chamber and interposed between said inlet and outlet, for separating substantially all of said paper chips from said stream of air being introduced into said chamber, said perforated screen means having perforations dimensioned sufficiently large to permit the passage of air therethrough and sufficiently small to prevent the passage of said paper chips therethrough, and said perforated screen means being so constructed and positioned within said chamber as to permit free passage into said chamber of said stream of air containing said paper chips, to separate substantially all of said paper chips from said stream of air, to allow said separated paper chips to be collected, stored and compacted in said lower portion of said chamber, and to allow withdrawal from said lower portion of said chamber of a stream of air from which substantially all of said paper chips have been removed, all of said separated paper chips being collected, stored and compacted on said bottom;
   said inlet and outlet ports so positioned in said chamber as to cause, in cooperation with said perforated screen means, all of said paper chips collected and stored therein to be compacted by the downward flow of air from said inlet port through said perforated screen means and to said outlet port of said chamber.

2. The waste bin of claim 1 wherein said outlet port is located in said side member and near said bottom of said chamber.

3. The waste bin of claim 1 wherein said chamber is elevated.

4. The waste bin of claim 1 wherein said inlet port is located in said side member and near said top member of said chamber.

5. A waste bin for pneumatically collecting, storing and compacting paper chips comprising:
   a chamber for receiving, compacting and collecting said paper chips, said chamber having an upper portion and a lower portion in which said paper chips are stored and compacted, and having an inlet port in said upper portion for introducing into said upper portion of said chamber a stream of air containing said paper chips and an outlet port in said lower portion for withdrawing from said lower portion of said chamber a stream of air from which substantially all of said paper chips have been removed, said chamber also having a side member and a bottom member, all of said separated paper chips being collected, stored and compacted on said bottom;
   perforated screen means in the interior of said chamber for separating substantially all of said paper chips from said stream of air being introduced into said chamber, said perforated screen means having perforations dimensioned sufficiently large to permit the passage of air therethrough and sufficiently small to prevent the passage of said paper chips therethrough, and said perforated screen means being so constructed and positioned within said chamber as to permit free passage into said chamber of said stream of air containing said paper chips, to separate substantially all of said paper chips from said stream of air, to allow said separated paper chips to be collected, stored and compacted in said lower portion of said chamber, and to allow withdrawal from said lower portion of said chamber of a stream of air from which substantially all of said paper chips have been removed, said perforated screen means comprising a substantially vertical container formed of perforated screen and having upper and lower portions and top and side members, being open at its bottom, and having an inlet port in said upper portion thereof for entry of said paper chips therein, said container extending from said upper portion of said chamber downward, and abutting said bottom member; and a tube having its ends attached to the inlet ports in said container and said chamber to provide a conduit for passage of said paper chips into said substantially vertical container;

said inlet and outlet ports so positioned in said chamber as to cause, in cooperation with said perforated screen means, all of said paper chips collected and stored therein to be compacted by the downward flow of air from said inlet port through said perforated screen means and to said outlet port of said chamber.

6. A waste bin for pneumatically collecting, storing and compacting paper chips comprising a juxtaposed pair of containers, each of which comprises:

a chamber for receiving, storing, compacting and collecting said paper chips, said chamber being vertically elongated and having an upper portion and a lower portion in which said paper chips are stored and compacted, and having an inlet port in said upper portion for introducing into said upper portion of said chamber a stream of air containing said paper chips and an outlet port in said lower portion for withdrawing from said lower portion of said chamber a stream of air from which substantially all of said paper chips have been removed, said chamber also having a top member, a side member, a bottom and an outlet portion, said bottom including a panel closure slidably movable to open a portion of said bottom to allow collected and compacted paper chips to fall from said chamber by the force of gravity, and said outlet portion extending downward into abutting relation with said panel closure;

perforated screen means in the interior of said chamber and interposed between said inlet and outlet, for separating substantially all of said paper chips from said stream of air being introduced into said chamber, said perforated screen means having perforations dimensioned sufficiently large to permit the passage of air therethrough and sufficiently small to prevent the passage of said paper chips therethrough, and said perforated screen means being so constructed and positioned within said chamber as to permit free passage into said chamber of said stream of air containing said paper chips, to separate substantially all of said paper chips from said stream of air, to allow said separated paper chips to be collected, stored and compacted in said lower portion of said chamber, and to allow withdrawal from said lower portion of said chamber of a stream of air from which substantially all of said paper chips have been removed, all of said separated paper chips being collected, stored and compacted on said bottom; and said inlet and outlet ports so positioned in said chamber as to cause, in cooperation with said perforated screen means, all of said paper chips collected and stored therein to be compacted by the downward flow of air from said inlet port through said perforated screen means and to said outlet port of said chamber.

7. The waste bin of claim 6 including additionally means for directing the stream of air containing the paper chips alternately into one or the other of said pair of containers.

8. The waste bin of claim 7 wherein said directing means is a valve for simultaneously opening said inlet and outlet ports of the container into which the stream of air is being directed and closing said inlet and outlet ports of the other of the pair of containers.

* * * * *